US012725491B2

(12) United States Patent
Mattison et al.

(10) Patent No.: US 12,725,491 B2
(45) Date of Patent: Sep. 1, 2026

(54) REMOTE VALIDATION OF AUTOMATED TELLER MACHINES (ATMS) USING MACHINE LEARNING

(71) Applicant: Bank of America Corporation, Charlotte, NC (US)

(72) Inventors: Paul Mattison, Sherrills Ford, NC (US); Matthew Williams, Frisco, TX (US); Tanikia V. Simpson, Fairview Heights, IL (US); Kristi Kae Duncan, Fairview Heights, IL (US); Jeffrey A. Beacham, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 769 days.

(21) Appl. No.: 18/120,461

(22) Filed: Mar. 13, 2023

(65) Prior Publication Data

US 2024/0312317 A1 Sep. 19, 2024

(51) Int. Cl.

| | |
|---|---|
| ***G07F 19/00*** | (2006.01) |
| ***G06N 5/022*** | (2023.01) |
| ***G06Q 10/047*** | (2023.01) |
| ***G06Q 10/20*** | (2023.01) |

(52) U.S. Cl.

CPC ........... *G07F 19/209* (2013.01); *G06N 5/022* (2013.01); *G06Q 10/20* (2013.01); *G06Q 10/047* (2013.01)

(58) Field of Classification Search

CPC .... G07F 19/209; G07F 19/211; G07F 19/206; G06N 5/022; G06N 20/00; G06Q 10/20; G06Q 10/047; G06Q 20/1085; G06Q 10/00

See application file for complete search history.

(56) References Cited

U.S. PATENT DOCUMENTS

| | | | |
|---|---|---|---|
| 11,354,403 | B1 | 6/2022 | Ricket et al. |
| 11,385,623 | B2 | 7/2022 | Cella et al. |
| 11,507,932 | B2 | 11/2022 | Phillips et al. |

(Continued)

FOREIGN PATENT DOCUMENTS

CN 113191880 A * 7/2021 ....... G06F 18/23213

OTHER PUBLICATIONS

M. Asad, M. Shahzaib, Y. Abbasi and M. Rafi, "A Long-Short-Term-Memory Based Model for Predicting ATM Replenishment Amount," 2020 21st International Arab Conference on Information Technology (ACIT), Giza, Egypt, 2020, pp. 1-6 (Year: 2020).*

*Primary Examiner* — Bennett M Sigmond
*Assistant Examiner* — Bolko M Hamerski
(74) *Attorney, Agent, or Firm* — Banner & Witcoff, Ltd.

(57) ABSTRACT

Aspects of the disclosure relate to a remote validation platform for ATMs. The platform may train a reconfiguration model to output sets of configuration instructions. The platform may receive a first information stream from a first ATM. The platform may receive one or more additional information streams from sources associated with the first ATM. The platform may generate, using the reconfiguration model, a first set of configuration instructions based on the first information stream and the one or more additional information streams. The platform may cause reconfiguration of the first ATM based on the first set of configuration instructions. The platform may refine the reconfiguration model based on the first set of configuration instructions.

20 Claims, 9 Drawing Sheets

(56) References Cited

U.S. PATENT DOCUMENTS

| | | | |
|---|---|---|---|
| 11,526,822 | B2 | 12/2022 | Kochar et al. |
| 11,543,951 | B2 | 1/2023 | Gervais et al. |
| 11,550,229 | B1 | 1/2023 | Su et al. |
| 11,556,911 | B2 | 1/2023 | Gottstein et al. |
| 11,568,331 | B2 | 1/2023 | Volchegursky et al. |
| 11,570,016 | B2 | 1/2023 | Johnson et al. |
| 11,573,643 | B2 | 2/2023 | Singh |
| 11,575,684 | B2 | 2/2023 | Alexander et al. |
| 11,580,229 | B2 | 2/2023 | Ambekar et al. |
| 11,586,177 | B2 | 2/2023 | Cella et al. |
| 11,586,178 | B2 | 2/2023 | Cella et al. |
| 11,586,488 | B2 | 2/2023 | Panda et al. |
| 2016/0379433 | A1* | 12/2016 | Lavigne ................ G07D 11/50 271/3.14 |
| 2022/0051209 | A1* | 2/2022 | Kolls ..................... G05D 1/021 |
| 2023/0008226 | A1 | 1/2023 | Delavari-Maraghi et al. |
| 2023/0015612 | A1 | 1/2023 | Jung et al. |
| 2023/0032429 | A1 | 2/2023 | Raj Susairaju et al. |
| 2023/0034548 | A1 | 2/2023 | Deshmukh et al. |
| 2023/0052766 | A1 | 2/2023 | Choe et al. |

* cited by examiner

300

Validation Notification Interface

Welcome, <Enterprise User Profile>

Notification: ATM XXXX Reconfigured

Current Cassette Configuration: Bin 1 = Recycle Mode, Bin 2 = Recycle Mode, Bin 3 = Deposit Mode, Bin 4 = Withdrawal Mode Current Bill Thresholds: Bin 1 = 2000 Bills, Bin 2 = 2000 Bills, Bin 3 = 2500 Bills, Bin 4 = 2500 Bills Confirm Configuration?

REMOTE VALIDATION OF AUTOMATED TELLER MACHINES (ATMS) USING MACHINE LEARNING

BACKGROUND

Aspects of the disclosure relate to remote validation of automated teller machines (ATMs). In some instances, ATMs may include multiple cassettes configured to receive particular quantities and types of bills (e.g., twenty dollar bills, fifty dollar bills, twenty pound notes, twenty euro notes, and/or other types of bills). In some examples, these cassettes may further be configured for one or more modes of operations (e.g., a deposit mode, a withdrawal mode, and/or other modes). In some instances, these cassettes may require validation of their configurations. In these instances, an ATM servicer may be required to go to the physical location of an ATM and validate the configuration of the cassettes (e.g., by sending images of the configurations to an enterprise, such as a financial institution and/or other institutions). This validation process may be time and resource intensive. Accordingly, it may be important to improve validation process for ATMs.

SUMMARY

Aspects of the disclosure provide effective, efficient, scalable, and convenient technical solutions that address and overcome the technical problems associated with validation of ATMs. In accordance with one or more arrangements of the disclosure, a computing platform with at least one processor, a communication interface, and memory storing computer-readable instructions may train a reconfiguration model based on historical configuration information. Training the reconfiguration model may configure the reconfiguration model to output sets of configuration instructions for an ATM. The computing platform may receive a first information stream from a first ATM. The first ATM may comprise a plurality of cassettes. Each of the plurality of cassettes may comprise a corresponding cassette mode. The computing platform may receive one or more additional information streams from one or more sources associated with the first ATM. The computing platform may generate a first set of configuration instructions for the first ATM based on inputting the first information stream and the one or more additional information streams into the reconfiguration model. The computing platform may cause reconfiguration of the first ATM based on the first set of configuration instructions. Reconfiguration of the first ATM may comprise setting one or more cassette thresholds for one or more of the plurality of cassettes. Each of the one or more cassettes thresholds may correspond to a particular type of bill. Reconfiguration of the first ATM may further include modifying the corresponding cassette mode for one or more of the plurality of cassettes (e.g., changing the corresponding cassette mode for a cassette to a different cassette mode). The computing platform may refine the reconfiguration model based on the first set of configuration instructions.

In one or more examples, the one or more sources associated with the first ATM may comprise one or more additional ATMs located within a predetermined proximity to the first ATM. In one or more instances, the one or more sources associated with the first ATM may comprise one or more of: weather reporting services, ATM servicing providers, financial institutions, event notification services, or community notification services. In one or more examples, the modifying of the corresponding cassette mode may comprise changing the corresponding cassette mode for one or more of the plurality of cassettes. The corresponding cassette mode may be changed to one of: a recycle mode, a deposit mode, a withdrawal mode, or a reject mode.

In one or more instances, the first information stream may comprise one or more of: one or more current bill counts, where each of the one or more current bill counts may correspond to a particular cassette of the plurality of cassettes, one or more current bill thresholds, where each of the one or more current bill thresholds may correspond to a particular cassette of the plurality of cassettes, or one or more current cassette modes, where each of the one or more current cassette modes may correspond to a particular cassette of the plurality of cassettes.

In one or more examples, the one or more additional information streams may comprise one or more of: one or more current bill thresholds corresponding to one or more additional ATMs, one or more current cassette modes corresponding to one or more additional ATMs, current weather information, servicing information corresponding to the first ATM, current event information for a geographical region corresponding to the first ATM, configuration preferences corresponding to a financial institution associated with the first ATM, or community information for a geographical region corresponding to the first ATM.

In one or more instances, the computing platform may receive a request to validate the first ATM from an enterprise user device corresponding to an enterprise associated with the first ATM. The computing platform may request the first information stream from the first ATM based on the request to validate the first ATM. In one or more examples, the computing platform may identify a reconfiguration result, based on an updated information stream received from the first ATM. The reconfiguration result may indicate whether or not the first ATM is validated. In one or more instances, causing the reconfiguration of the first ATM may be based on identifying that the reconfiguration result indicates that the first ATM is validated.

In one or more examples, the computing platform may automatically request the first information stream from the first ATM based on identifying that a predetermined period of time has elapsed. In one or more instances, the computing platform may cause a service device associated with the first ATM to update a service schedule corresponding to the first ATM, based on the first set of configuration instructions. The computing platform may send one or more display commands to the service device. The one or more display commands may cause the service device to display a user interface. The user interface may comprise information of the first ATM and the updated service schedule.

In one or more examples, the computing platform may cause an autonomous vehicle associated with a service provider corresponding to the first ATM to modify a service route corresponding to a plurality of ATMs, based on the first set of configuration instructions. In one or more instances, the causing reconfiguration of the first ATM may comprise automatically reconfiguring the first ATM.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
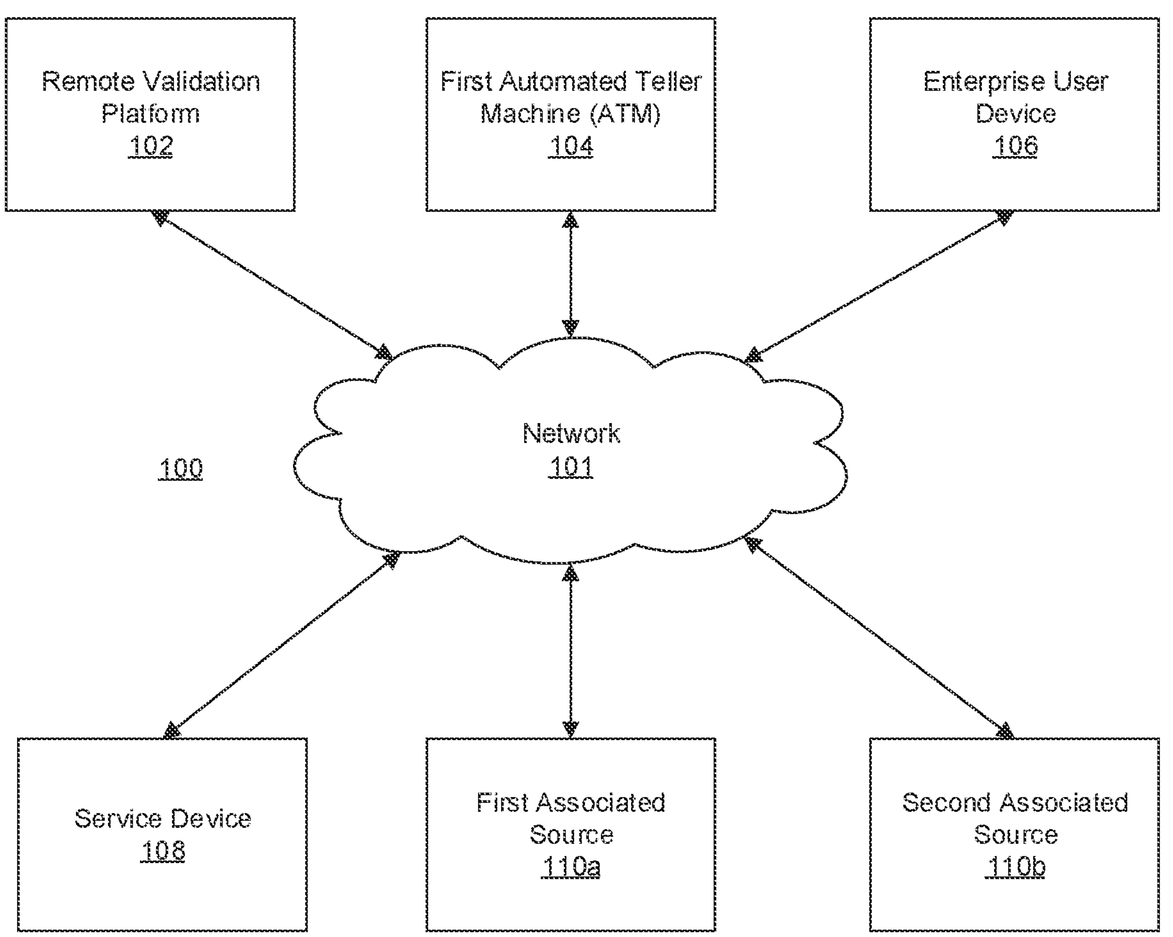
FIGS. 1A-1B depict an illustrative computing environment for remote validation of ATMs in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for remote validation of ATMs. Service providers (e.g., an enterprise organization, such as a financial institution and/or other institutions) may manage one or more ATMs. Each ATM may include one or more cassettes or bins used to store bills (i.e., paper currency) that may be configured for particular modes of operation (e.g., a deposit mode, a withdrawal mode, a recycle mode, a reject mode, and/or other modes) that may determine how the cassettes treat bills deposited with and/or withdrawn from the ATM. The cassettes may further be configured with thresholds limiting a number of bills the respective cassette may store. The configuration of these cassettes may require validation from time to time (e.g., based on the service provider's preferences and/or otherwise). Currently, in some instances, an ATM servicer (e.g., an employee of an ATM repair organization, and/or other organizations) may be required to go to the physical location of the ATM and inform the service provider (e.g., by sending pictures, and/or other methods) of the configuration of the cassettes, which the service provider may then use to validate the configurations. Overall, this conventional process of validation is outdated and inefficient. Accordingly, to overcome the issues associated with this physical validation process (e.g., poor efficiency, the significant length of time needed to validate, resources needed for the ATM servicer to physically validate the ATM, and/or other issues) the service provider may employ a system for remote validation of ATMs, as described further herein. The system may implement a reconfiguration model that uses machine learning to affect the remote validation process by generating sets of configuration instructions and remotely causing reconfiguration of the ATMs based on the configuration instructions.

Service providers may employ the system described above by training the reconfiguration model based on historical configuration information (e.g., historical bill counts, historical bill thresholds, historical cassette modes, historical weather information, historical servicing information, historical configuration preferences corresponding to the service provider, historical event information for a geographical region, historical community information for a geographical region, historical withdrawal information, historical deposit information, and/or other configuration information). The system may identify an ATM (e.g., a first ATM) for remote validation. In some instances, the system may identify the ATM based on a request received from the service provider (e.g., via an enterprise user device, and/or via other methods). In other examples, the system may identify the ATM automatically, based on one or more criteria (e.g., the passage of a preset and/or predetermined period of time, and/or other criteria). After identifying the ATM for remote validation, the system may receive a first information stream (e.g., current configuration information, and/or other information) from the ATM and one or more additional information streams from one or more additional sources associated with the ATM (e.g., weather reporting services, ATM servicing providers, financial institutions, event notification services, community notification services, and/or other sources). The system may input these information streams into the reconfiguration model to generate a set of configuration instructions for the ATM. For example, the reconfiguration model may compare the information from the first information stream and the one or more additional information streams (which may, e.g., represent the current configuration and environment of the ATM) to the historical configuration information. In doing so, the system may generate configuration instructions, which may be sent to the ATM to modify the configuration of the ATM to reflect the current environment (e.g., modifying the configuration to prepare for an expected influx of withdrawals based on a local event, such as a concert, and/or other local events).

After generating the set of configuration instructions, the system may cause the ATM to reconfigure its cassettes. In some instances, the reconfiguration may include setting new thresholds for the number and/or type of bills the cassettes may store. In some examples, the reconfiguration may additionally or alternatively include modifying the mode of operation corresponding to one or more of the cassettes (e.g., changing a deposit-mode cassette to a withdrawal-mode cassette). The system may subsequently identify (e.g., based on an updated information stream from the ATM) whether or not the ATM is validated (i.e., the configuration of each of the cassettes matches the configuration instructions). In some instances, based on identifying that the ATM is validated, the system may notify the service provider (e.g., via the enterprise user device, and/or by other methods). Additionally or alternatively, in some instances the system may cause an ATM servicer to update a service schedule (e.g., by notifying the servicer that the ATM does not require physical validation, by changing the route of an autonomous vehicle associated with the ATM servicer, and/or by other methods). In some examples, based on identifying that the ATM is not validated, the system may generate a new set of configuration instructions as described above. The system may also refine the reconfiguration model based on the first set of configuration instructions.

Figure 1B:
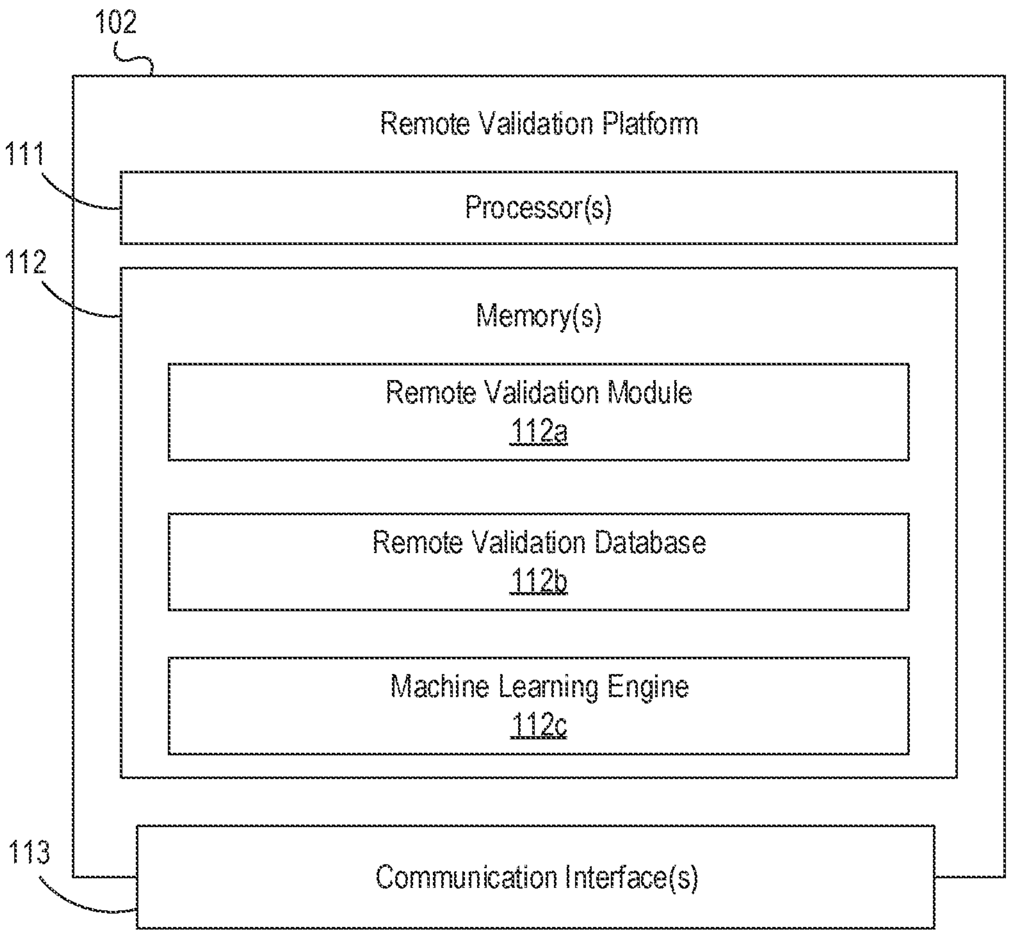

FIGS. 1A-1B depict an illustrative computing environment for remote validation of ATMs in accordance with one or more example arrangements. Referring to FIG. 1A, computing environment 100 may include one or more computer systems. For example, computing environment 100 may include a remote validation platform 102, a first automated teller machine (ATM) 104, an enterprise user device 106, a service device 108, and one or more sources associated with first ATM 104 (e.g., first associated source

110*a*, second associated source 110*b*, and/or other sources associated with first ATM 104).

As described further below, remote validation platform 102 may be a computer system that includes one or more computing devices (e.g., servers, server blades, or the like) and/or other computer components (e.g., processors, memories, communication interfaces) that may be used to configure, train and/or execute one or more machine learning models (e.g., a reconfiguration model). For example, the remote validation platform 102 may train the one or more machine learning models to generate a set of configuration instructions for an ATM. In some instances, remote validation platform 102 may be controlled or otherwise maintained by an enterprise organization (e.g., a financial institution, and/or other institutions). Although shown as an independent computing platform, in some instances, the remote validation platform 102 may be part of and/or otherwise associated with a cloud-based platform (e.g., the remote validation platform 102 may be hosted by a cloud-based platform). Additionally or alternatively, in some instances, the remote validation platform 102 may be part of and/or otherwise integrated into the enterprise user device 106 without departing from the scope of the disclosure.

First ATM 104 may be and/or otherwise include one or more computing devices (e.g., servers, server blades, and/or other devices) and/or other computer components (e.g., processors, memories, communication interfaces) that may be used to receive and dispense bills and/or to communicate with an enterprise such as a financial institution and/or other institutions (e.g., to access an account managed by the enterprise). The first ATM 104 may include a plurality of cassettes that may be designed and/or configured to receive and dispense bills. The first ATM 104 may further include a plurality of cassette modes corresponding to the plurality of cassettes. First ATM 104 may be managed and/or otherwise associated with an enterprise organization (e.g., a financial institution, and/or other institutions). In some instances, first ATM 104 may be integrated into a network of one or more additional ATMs that may also be managed and/or otherwise associated with an enterprise organization (e.g., the financial institution associated with first ATM 104, and/or other institutions).

Enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., requesting user input, sending validation requests, and/or other functions). In one or more instances, enterprise user device 106 may correspond to an enterprise user (who may, e.g., be an employee of the enterprise organization, such as a financial institution and/or other institution). In one or more instances, the enterprise user device 106 may be configured to communicate with one or more systems (e.g., remote validation platform 102 and/or other systems) to perform a data transfer, send validation requests, and/or to perform other functions. In some instances, the enterprise user device 106 may be configured to display one or more graphical user interfaces (e.g., validation notification interface, and/or other interfaces).

Service device 108 may be a computing device (e.g., laptop computer, desktop computer, mobile device, tablet, smartphone, server, server blade, autonomous vehicle processing unit, and/or other device) and/or other data storing or computing component (e.g., processors, memories, communication interfaces, databases) that may be used to transfer data between users and/or perform other functions (e.g., updating servicing schedules, receiving sets of configuration instructions, directing an autonomous vehicle, and/or other functions). In one or more instances, service device 108 may correspond to a user (who may, e.g., be an employee of the enterprise organization, such as a financial institution, and/or other institution, an employee of an ATM servicer, such as an ATM repair company, and/or other servicers, and/or other users). In one or more instances, the service device 108 may be configured to communicate with one or more systems (e.g., remote validation platform 102 and/or other systems) to perform a data transfer, update servicing schedules, receive sets of configuration instructions, direct an autonomous vehicle, and/or to perform other functions. In some instances, the service device 108 may be configured to display one or more graphical user interfaces (e.g., a servicing schedule interface, and/or other interfaces).

First associated source 110*a* may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between devices. In one or more instances, first associated source 110*a* may be operated, controlled, and/or otherwise managed by an organization and/or service (e.g., a weather reporting service, an ATM servicing provider, a financial institution (which may, e.g., be a financial institution associated with first ATM 104), an event notification service, a community notification service, and/or other organizations/services) associated with first ATM 104 (e.g., via a business relationship, a contract, a subscription, and/or other forms of association).

Second associated source 110*b* may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between devices. In one or more instances, second associated source 110*b* may be operated, controlled, and/or otherwise managed by an organization and/or service (e.g., a weather reporting service, an ATM servicing provider, a financial institution (which may, e.g., be a financial institution associated with first ATM 104), an event notification service, a community notification service, and/or other organizations/services) associated with first ATM 104 (e.g., via a business relationship, a contract, a subscription, and/or other forms of association).

Computing environment 100 also may include one or more networks, which may interconnect remote validation platform 102, first ATM 104, enterprise user device 106, service device 108, first associated source 110*a*, and second associated source 110*b*. For example, computing environment 100 may include a network 101 (which may interconnect, e.g., remote validation platform 102, first ATM 104, enterprise user device 106, service device 108, first associated source 110*a*, and second associated source 110*b*).

In one or more arrangements, remote validation platform 102, first ATM 104, enterprise user device 106, service device 108, first associated source 110*a*, and second associated source 110*b* may be any type of computing device capable of sending and/or receiving requests and processing the requests accordingly. For example, remote validation platform 102, enterprise user device 106, and service device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. First ATM 104 may be and/or include servers, server blades, and/or other devices, or the like that may include one or more processors, memories, and/or communication interfaces. As noted above, and as illustrated in greater detail below, any and/or all of remote validation platform 102, first ATM 104, enterprise user device 106, service device 108, first associated source 110*a*, and second associated source 110*b*, may, in some instances, be special-purpose computing devices configured to perform specific functions.

Referring to FIG. 1B, remote validation platform 102 may include one or more processors 111, memory 112, and communication interface 113. A data bus may interconnect processor 111, memory 112, and communication interface 113. Communication interface 113 may be a network interface configured to support communication between remote validation platform 102 and one or more networks (e.g., network 101, or the like). Communication interface 113 may be communicatively coupled to the processor 111. Memory 112 may include one or more program modules having instructions that, when executed by processor 111, cause remote validation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of remote validation platform 102 and/or by different computing devices that may form and/or otherwise make up remote validation platform 102. For example, memory 112 may have, host, store, and/or include remote validation module 112*a*, remote validation database 112*b*, and machine learning engine 112*c*.

Remote validation module 112*a* may have instructions that direct and/or cause remote validation platform 102 to generate sets of configuration instructions for remote validation of ATMs. Remote validation database 112*b* may have instructions causing remote validation platform 102 to store historical configuration information, information streams, sets of configuration instructions, and/or other information (that may, e.g., be used to generate sets of configuration instructions for remote validation of ATMs). Machine learning engine 112*c* may contain instructions causing remote validation platform 102 to train, implement, and/or update a machine learning model, such as the reconfiguration model, (that may, e.g., be used to generate sets of configuration instructions for remote validation of ATMs). In some instances, machine learning engine 112*c* may be used by remote validation platform 102 and/or remote validation module 112*a* to refine and/or otherwise update methods for remote validation of ATMs, and/or other methods described herein.

Figure 2A:
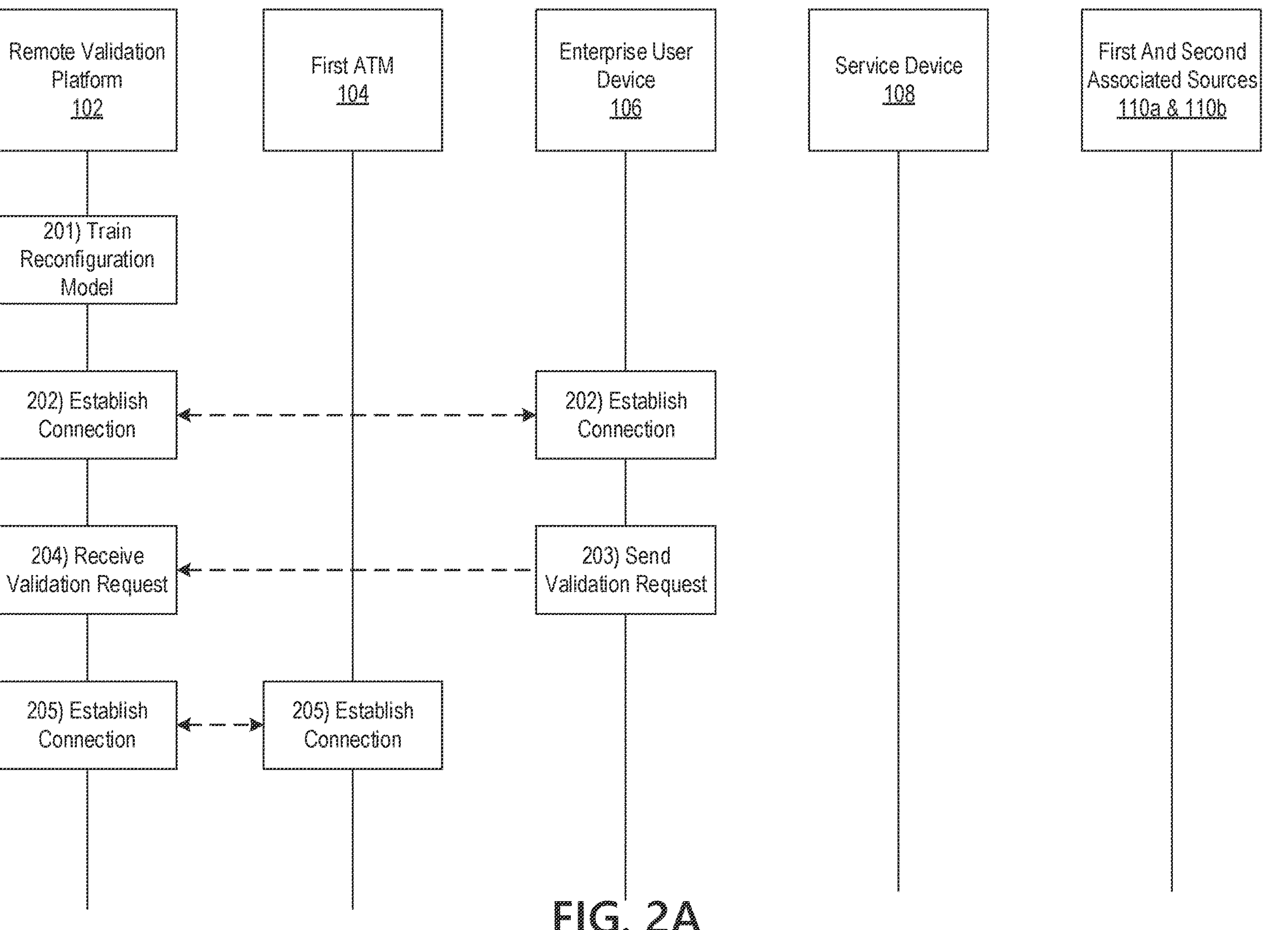
FIGS. 2A-2D depict an illustrative event sequence for remote validation of ATMs in accordance with one or more example arrangements.

FIGS. 2A-2D depict an illustrative event sequence for remote validation of ATMs in accordance with one or more example arrangements. Referring to FIG. 2A, at step 201, the remote validation platform 102 may train a reconfiguration model to output sets of configuration instructions for an ATM (e.g., first ATM 104). In some instances, the remote validation platform 102 may configure and/or otherwise train the reconfiguration model based on historical configuration information (e.g., from first ATM 104, and/or from one or more additional ATMs), which the remote validation platform 102 may, in some instances, have previously performed remote validation operations upon. For example, the remote validation platform 102 may receive one or more of: historical bill counts, historical bill thresholds, historical cassette modes, historical weather information, historical servicing information, historical configuration preferences corresponding to the service provider, historical event information for a geographical region, historical community information for a geographical region, historical withdrawal information, historical deposit information, and/or other historical configuration information.

The historical configuration information may be received from a central repository, such as a central database hosted and/or otherwise maintained by an enterprise organization (e.g., a financial institution associated with first ATM 104, a third party organization (e.g., source of weather information, or the like) and/or other institutions), various ATMs (e.g., first ATM 104 and/or other ATMs), and/or other repositories. In some instances, to configure and/or otherwise train the reconfiguration model, the remote validation platform 102 may process the historical configuration information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering. K-means clustering, and/or other unsupervised techniques), and/or other techniques. In doing so, the remote validation platform 102 may train the reconfiguration model to output one or more sets of configuration information for an ATM (e.g., first ATM 104).

In configuring and/or otherwise training the reconfiguration model, the remote validation platform 102 may identify correlations between subsets of information within the historical configuration information. For example, the remote validation platform 102 may compare historical withdrawal information indicating an increased amount of withdrawals occur on a particular day (e.g., Friday) with historical cassette modes indicating that the number of cassettes operating in a withdrawal mode for a particular ATM remains constant every day of the week (e.g., two out of four cassettes are configured to operate in withdrawal mode). Based on this comparison, the remote validation model may train the reconfiguration model to generate configuration instructions directing the ATM (e.g., first ATM 104) to configure an increased number of cassettes to operate in withdrawal mode on Fridays (e.g., three out of four cassettes being configured to operate in withdrawal mode), in order to meet a predicted increase in demand for withdrawals on Fridays (e.g., by storing a correlation between Fridays and the number of cassettes configured to operate in withdrawal mode).

Additionally or alternatively, in configuring and/or otherwise training the reconfiguration model the remote validation platform 102 may input the historical configuration information into the reconfiguration model. Based on inputting the historical configuration information into the reconfiguration model, the remote validation platform 102 may identify preferences (e.g., preferences of the enterprise organization, and/or other preferences) corresponding to the historical configuration information. For example, the remote validation platform 102 may identify historical event information corresponding to, e.g., an annual parade occurring in a particular geographic proximity (e.g., 10 blocks) of the ATM. The remote validation platform 102 may further identify, for example, historical cassette modes indicating that all of the cassettes in the ATM have historically been configured to operate in a recycle mode (e.g., the cassette is configured to receive bills deposited by a user of the first ATM 104 and dispense those same bills to additional users of the first ATM 104 requesting a withdrawal) the day of the annual parade. The remote validation platform 102 may identify the pattern of configuring all cassette modes to operate in recycle mode the day of the annual parade as a preference of the enterprise organization managing the ATM (e.g., by storing a correlation between the day of the annual parade and the cassette configuration). As a result, the remote validation platform 102 may train the reconfiguration model to generate reconfiguration instructions directing the ATM to reconfigure all of its cassettes into recycle mode on the day of the annual parade.

At step 202, remote validation platform 102 may establish a connection with enterprise user device 106. For example, remote validation platform 102 may establish a first wireless data connection with the enterprise user device 106 to link the enterprise user device 106 with the remote validation platform 102 (e.g., in preparation for receiving a validation request, sending a validation notification, and/or other functions). In some instances, the remote validation platform 102 may identify whether or not a connection is already established with the enterprise user device 106. If a connection is already established with the enterprise user device 106, the remote validation platform 102 might not re-establish the connection. If a connection is not yet established with the enterprise user device 106, the remote validation platform 102 may establish the first wireless data connection as described above.

At step 203, enterprise user device 106 may send a validation request to remote validation platform 102. For example, the enterprise user device 106 may send the validation request via the communication interface 113 and while the first wireless data connection is established. The validation request may correspond to a particular ATM (e.g., first ATM 104). In some instances, the validation request may be sent based on user input received from an enterprise user corresponding to the enterprise user device 106 (e.g., an employee of the enterprise organization corresponding to the first ATM 104). Additionally or alternatively, in some instances, the remote validation platform 102 may be configured to automatically validate the first ATM 104. In these instances, step 203 might not be performed and the remote validation platform 102 may receive an indicator that first ATM 104 requires validation (e.g., as described below at step 204).

At step 204, remote validation platform 102 may receive the validation request. For example, the remote validation platform 102 may receive the validation request from the enterprise user device 106 via the communication interface 113 and while the first wireless data connection is established. Additionally or alternatively, in some instances, the remote validation platform 102 may be configured to automatically validate the first ATM 104. For example, the remote validation platform 102 may automatically validate the first ATM 104 based on the passage of a predetermined period of time (e.g., a day, a week, a month, and/or other periods of time). In these instances, the remote validation platform 102 may receive an indicator or detect a trigger that the first ATM 104 requires validation (e.g., an indicator or trigger from internal memory that the predetermined period of time has passed) in addition or alternatively to receiving the validation request from the enterprise user device 106.

At step 205, remote validation platform 102 may establish a connection with first ATM 104. For example, remote validation platform 102 may establish a second wireless data connection with the first ATM 104 to link the first ATM 104 with the remote validation platform 102 (e.g., in preparation for reconfiguring the first ATM 104, and/or other functions). In some instances, the remote validation platform 102 may identify whether or not a connection is already established with the first ATM 104. If a connection is already established with the first ATM 104, the remote validation platform 102 might not re-establish the connection. If a connection is not yet established with the first ATM 104, the remote validation platform 102 may establish the second wireless data connection as described above.

Figure 2B:
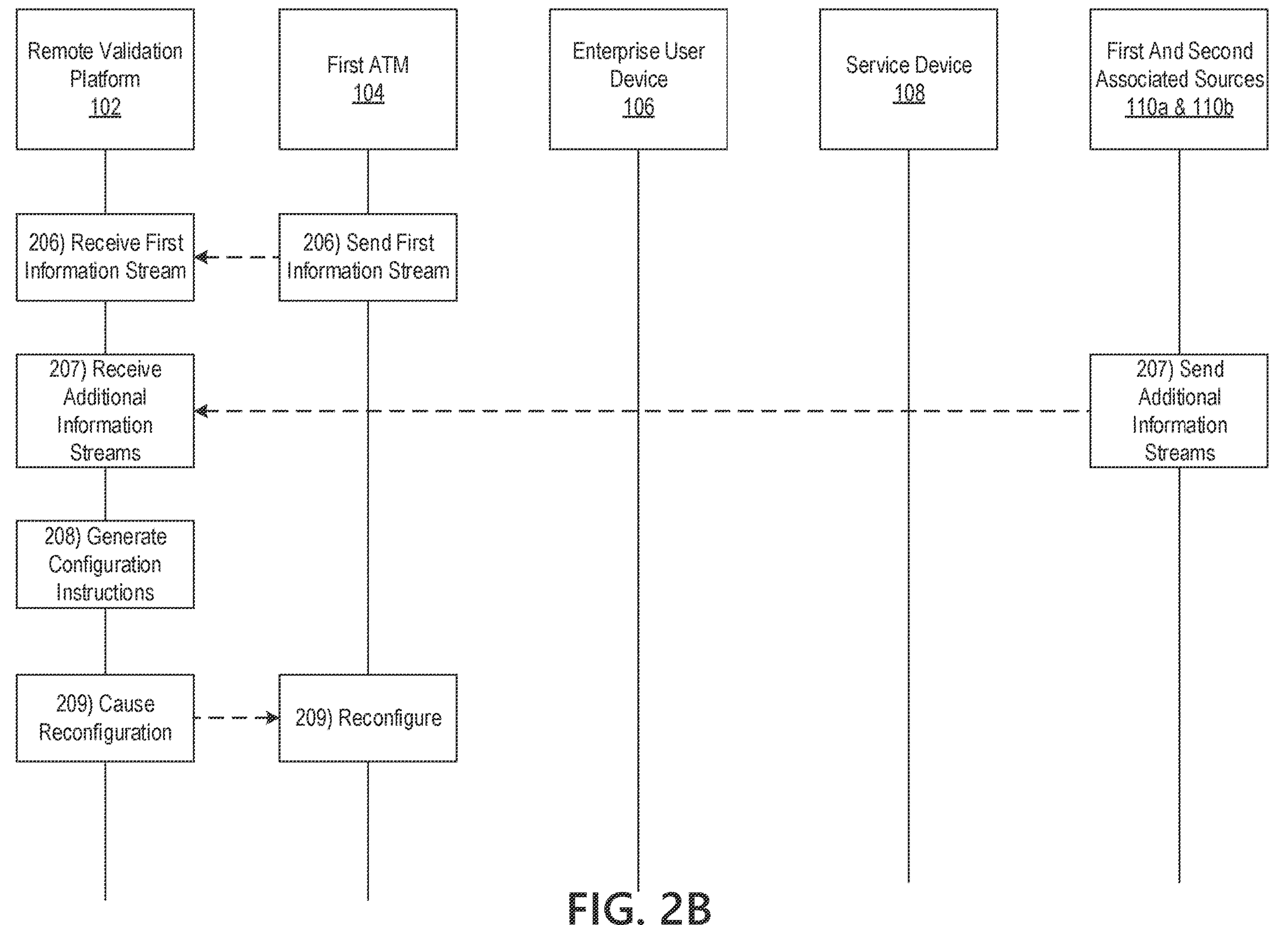

Referring to FIG. 2B, at step 206, the remote validation platform 102 may receive a first information stream from the first ATM 104. For example, the remote validation platform 102 may receive the first information stream via the communication interface 113 and while the second wireless data connection is established. In some instances, the remote validation platform 102 may receive the first information stream based on or in response to a request sent from the remote validation platform 102 to the first ATM 104. In some examples, the remote validation platform 102 may automatically receive the first information stream from the first ATM 104 (e.g., based on one or more commands stored in the first ATM 104 directing the first ATM 104 to send the first information stream to the remote validation platform 102 after a preset period of time). The first information stream may include one or more of: one or more current bill counts, each corresponding to a particular cassette of the plurality of cassettes, one or more current bill thresholds, each corresponding to a particular cassette, one or more current cassette modes, each corresponding to a particular cassette, and/or other information. For example, the first information stream may include, for a particular cassette, information indicating the cassette currently is configured to operate in a recycle mode, contains 1000 bills, and has a bill threshold of 2000 bills.

At step 207, the remote validation platform 102 may receive one or more additional information streams from one or more sources associated with the first ATM 104. For example, the remote validation platform 102 may receive the additional information streams from one or more of first associated source 110*a*, second associated source 110*b*, and/or other associated sources. In receiving the additional information streams, remote validation platform 102 may receive the additional information streams via the communication interface 113. The one or more additional information streams may include one or more of: one or more current bill thresholds corresponding to one or more additional ATMs, one or more current cassette modes corresponding to one or more additional ATMs, current weather information, servicing information corresponding to the first ATM 104, current event information for a geographical region corresponding to the first ATM 104, configuration preferences corresponding to a financial institution associated with the first ATM 104, community information for a geographical region corresponding to the first ATM 104, and/or other information.

In some instances, the one or more sources associated with the first ATM 104 (e.g., first associated source 110*a*, second associated source 110*b*, and/or other associated sources) may be or include one or more additional ATMs located within a predetermined proximity to the first ATM 104. The predetermined proximity may be determined by the enterprise organization associated with the first ATM 104. For example, the enterprise organization may have configured the remote validation platform 102 to receive the one or more additional information streams from every ATM associated with the enterprise organization within a ten block radius of the first ATM 104. Additionally or alternatively, in some examples the one or more additional ATMs may be located in a location sharing a same demographic trait as the first ATM 104. For instance, the one or more additional ATMs and the first ATM 104 may all be located in towns with populations less than 10,000 residents.

Additionally or alternatively, in some instances the one or more sources associated with the first ATM 104 may be and/or include one or more of weather reporting services, ATM servicing providers, financial institutions (e.g., the financial institution managing first ATM 104, a financial institution engaged in a partnership to manage first ATM 104, and/or other financial institutions), event notification services (e.g., a social media live feed corresponding to an event, a mobile application providing information of local events, cloud-based marketing services, and/or other event notification services), community notification services (e.g., a municipal alert service, a mass alert subscription service, a customer notification service associated with an enterprise, and/or other community notification services) and/or other sources associated with the first ATM 104. For example, one of the one or more sources associated with the first ATM 104 may be a mobile application providing information of local events. In this example, the mobile application may provide an additional information stream indicating that an event (e.g., a music concert) is occurring within a geographic proximity to the first ATM 104 to the remote validation platform 102 (e.g., using a wireless data connection and via the communication interface 113). Additionally or alternatively, in another example, one of the one or more sources associated with the first ATM 104 may be a municipal alert service providing information of public services. In this example, the municipal alert service may provide an additional information stream to remote validation platform 102 (e.g., using a wireless data connection and via the communication interface 113) indicating a group of road closures that may, e.g., hamper individuals from accessing ATMs located near first ATM 104.

At step 208, the remote validation platform 102 may generate a first set of configuration instructions for the first ATM 104 by inputting the first information stream and the one or more additional information streams into the reconfiguration model. In generating the first set of configuration instructions, the remote validation platform 102 may use the reconfiguration model to compare one or more subsets of the first information stream with one or more subsets of the one or more additional information streams. The remote validation platform 102 may further compare the one or more subsets of the first information stream and the one or more subsets of the one or more additional information streams with the historical configuration information. In comparing the one or more subsets of the first information stream with the one or more subsets of the one or more additional information streams (and further with the historical configuration information), the reconfiguration model may identify one or more changes to make to the cassette configurations of the cassettes in the first ATM 104 and/or to the bill thresholds of the cassettes in first ATM 104.

For example, the first information stream may include information indicating the first ATM 104 includes four cassettes: two cassettes configured to operate in a deposit mode (e.g., the cassettes are configured only to receive bills deposited by a user of the first ATM 104), one cassette configured to operate in a withdrawal mode (e.g., the cassette is configured only to dispense bills requested by a user of the first ATM 104), and one cassette configured to operate in a recycle mode (e.g., the cassette is configured to receive bills deposited by a user of the first ATM 104 and dispense those same bills to additional users of the first ATM 104 requesting a withdrawal). In this example, a particular information stream of the one or more additional information streams may be received from an event notification service and may, e.g., include information indicating that a music concert is scheduled to be held within 10 blocks of the first ATM 104. The reconfiguration model may have been previously trained (e.g., as described above at step 201) to recognize a correlation between the number of withdrawal requests an ATM (e.g., first ATM 104, and/or one or more additional ATMs) receives and the scheduled occurrence of a music concert within a certain distance from the ATM. Based on this correlation and the comparison of the information from the first information stream and the particular information stream of the one or more additional information streams, the reconfiguration model may identify that an increased number of withdrawals are requested from ATMs within the certain distance from music concerts, relative to the number of withdrawals requested from the same ATMs when there is not a scheduled music concert. Accordingly, the reconfiguration model may identify that one or more of the cassettes should be reconfigured to operate in a withdrawal mode, to meet a predicted increased demand in withdrawals, and may generate a first set of configuration instructions directing one cassette (e.g., one of the two cassettes configured to operate in deposit mode) to change its configuration to operate in withdrawal mode.

Additionally or alternatively, in some examples, the remote validation platform 102 may have previously trained the reconfiguration model to employ a reconfiguration algorithm to generate the first set of configuration instructions. In some instances, the reconfiguration algorithm may use some or all of the information of the first information stream and of the one or more additional information streams. For example, the reconfiguration model may execute the reconfiguration algorithm using the following constraints/parameters:

$$\text{If}\left(\frac{\text{(Number of cassettes configured for reject mode within 10 blocks of first } ATM \text{ 104)}}{\text{(Total number of cassettes within 10 blocks of first } ATM \text{ 104)}}\right) \geq 0.25,$$

$$\text{then required number of cassettes configured for reject mode in first } ATM \text{ 104} = 0.25 * \text{(number of cassettes in first } ATM \text{ 104).}$$

In this example, the one or more additional information streams may indicate cassette modes corresponding to the cassettes of one or more additional ATMs located within 10 blocks of first ATM 104. If more than one quarter of the total number of cassettes, within all of the one or more additional ATMs, are configured to operate in a reject mode (e.g., the cassettes are configured to receive bills that the first ATM 104 identifies as inauthentic and/or cannot identify as authentic), then the above algorithm dictates that one quarter of the cassettes in first ATM 104 must also be configured for reject mode. Accordingly, the reconfiguration model may generate a first set of configuration instructions directing one quarter of the cassettes in the first ATM 104 to be configured to operate in reject mode.

Additionally or alternatively, in some instances, the remote validation platform 102 may have previously trained the reconfiguration model to employ a threshold adjustment algorithm to generate the first set of configuration instructions. In some instances, the threshold adjustment algorithm may use some or all of the information of the first information stream and of the one or more additional information streams. For example, the reconfiguration model may execute the threshold adjustment algorithm using the following constraints/parameters:

$$\text{Average bill threshold} = \frac{\text{sum of bill thresholds for cassettes within 10 blocks of first } ATM \text{ 104}}{\text{Number of cassettes within 10 blocks of first } ATM \text{ 104}}.$$

If current bill threshold of cassette ≤ current bill count of cassette + 100, and current bill threshold of cassette < average bill threshold, then required bill threshold = average bill threshold.

In this example, using the above constraints, the required bill threshold for first ATM 104 is required to be the average bill threshold of all the cassettes in one or more additional ATMs located within 10 blocks of the first ATM 104, if and/or when two conditions are met. The two conditions are 1) the current bill threshold of a cassette within first ATM 104 (e.g., a cassette configured to operate in a recycle mode) is within 100 bills of the current bill count of the cassette and 2) the current bill threshold of the cassette is less than the average bill threshold. Accordingly, if the constraints are met, the reconfiguration model may generate the first set of configuration instructions directing the first ATM 104 to change the bill threshold (of the cassette configured to operate in recycle mode) to the average bill threshold of the one or more additional ATMs located within 10 blocks of the first ATM 104 (which may, e.g., be the one or more sources associated with the first ATM 104). For example, one or both of first associated source 110*a* and second associated source 110*b* may be an ATM within 10 blocks of the first ATM 104

At step 209, based on the first set of configuration instructions, the remote validation platform 102 may cause reconfiguration of the first ATM 104. In causing reconfiguration of the first ATM 104, the remote validation platform 102 may send the first set of configuration instructions to the first ATM 104, and may additionally send one or more commands directing the first ATM 104 to reconfigure its cassettes according to the first set of configuration instructions. For example, the remote validation platform 102 may send the first set of configuration instructions and the one or more commands while the second wireless data connection is established and via the communication interface 113. In some instances, the remote validation platform 102 may be configured to automatically validate the first ATM 104. In these instances, the causing reconfiguration of the first ATM 104 may be performed by the remote validation platform 102 automatically. In some examples, the remote validation platform 102 may be configured to receive user confirmation (e.g., from an enterprise user device, such as enterprise user device 106) prior to causing the reconfiguration of the first ATM 104.

In some instances, in causing reconfiguration of the first ATM 104, the remote validation platform 102 may cause the first ATM 104 to set one or more cassette thresholds (e.g., a maximum number of bills the cassette can store at a time). For example, the remote validation platform 102 may instruct, via the one or more commands directing the first ATM 104 to set the threshold, for one or more of its cassettes, to a new value. For instance, the remote validation platform 102 may cause the threshold for a particular cassette to increase from 2000 bills to 2500 bills. In some instances, the one or more cassette thresholds may each correspond to a particular type of bill. For example, the first ATM 104 may include at least two cassettes, wherein one of the at least two cassettes is configured in a deposit mode for, e.g., twenty dollar bills with a threshold of 2500 twenty dollar bills and the other of the at least two cassettes is configured in a deposit mode for, e.g., fifty dollar bills, with a threshold of 2000 fifty dollar bills. In this example the first ATM 104 may cause, based on the first set of configuration instructions, the cassette configured in deposit mode for twenty dollar bills to decrease the threshold to 2000 bills and the cassette configured in deposit mode for fifty dollar bills to increase the threshold to 2500 bills.

Additionally or alternatively, in some instances, in causing reconfiguration of the first ATM 104, the remote validation platform 102 may cause the first ATM 104 to modify, for one or more of a plurality of cassettes within the first ATM 104, a corresponding cassette mode (e.g., changing the mode the cassette is configured to operate in to one of: a recycle mode, a deposit mode, a withdrawal mode, or a reject mode). For example, the first ATM 104 may include four cassettes: two configured to operate in a recycle mode, one configured to operate in a deposit mode, one configured to operate in a reject mode. In this example, based on the first set of configuration instructions the remote validation platform 102 may cause (e.g., via the sending of the one or more commands) the first ATM 104 to modify the cassette modes for one or more of the four cassettes. For instance, the remote validation platform 102 may cause the first ATM 104 to modify the cassette mode for one of the cassettes configured to operate in recycle mode to operate in a withdrawal mode (e.g., based on the bill count of the cassette having reached its threshold) and the cassette mode for the cassette configured to operate in deposit mode to operate in recycle mode.

In one or more arrangements, the remote validation platform 102 may additionally cause the first ATM 104 to revert one or more of the corresponding cassette modes to an original or previous cassette mode (e.g., a cassette originally configured to operate in deposit mode and subsequently modified to operate in withdrawal mode may be reverted to operate in deposit mode). The remote validation platform 102 may cause the first ATM 104 to revert to the corresponding cassette mode based on one or more criteria (e.g., the passage of a predetermined amount of time, receiving instructions to revert the one or more corresponding cassette modes from an enterprise user device (e.g., enterprise user device 106, and/or other enterprise user devices), and/or other criteria). For instance, referring back to the above example where remote validation platform 102 caused the first ATM 104 to modify the cassette mode for one of the cassettes configured to operate in recycle mode to operate in a withdrawal mode, the remote validation platform 102 may cause, based on the passage of a predetermined period of time (e.g., a number of hours, a number of days, a number of weeks, and/or other periods of time) the first ATM 104 to revert the cassette configured to operate in withdrawal mode back to operating in recycle mode.

Figure 2C:
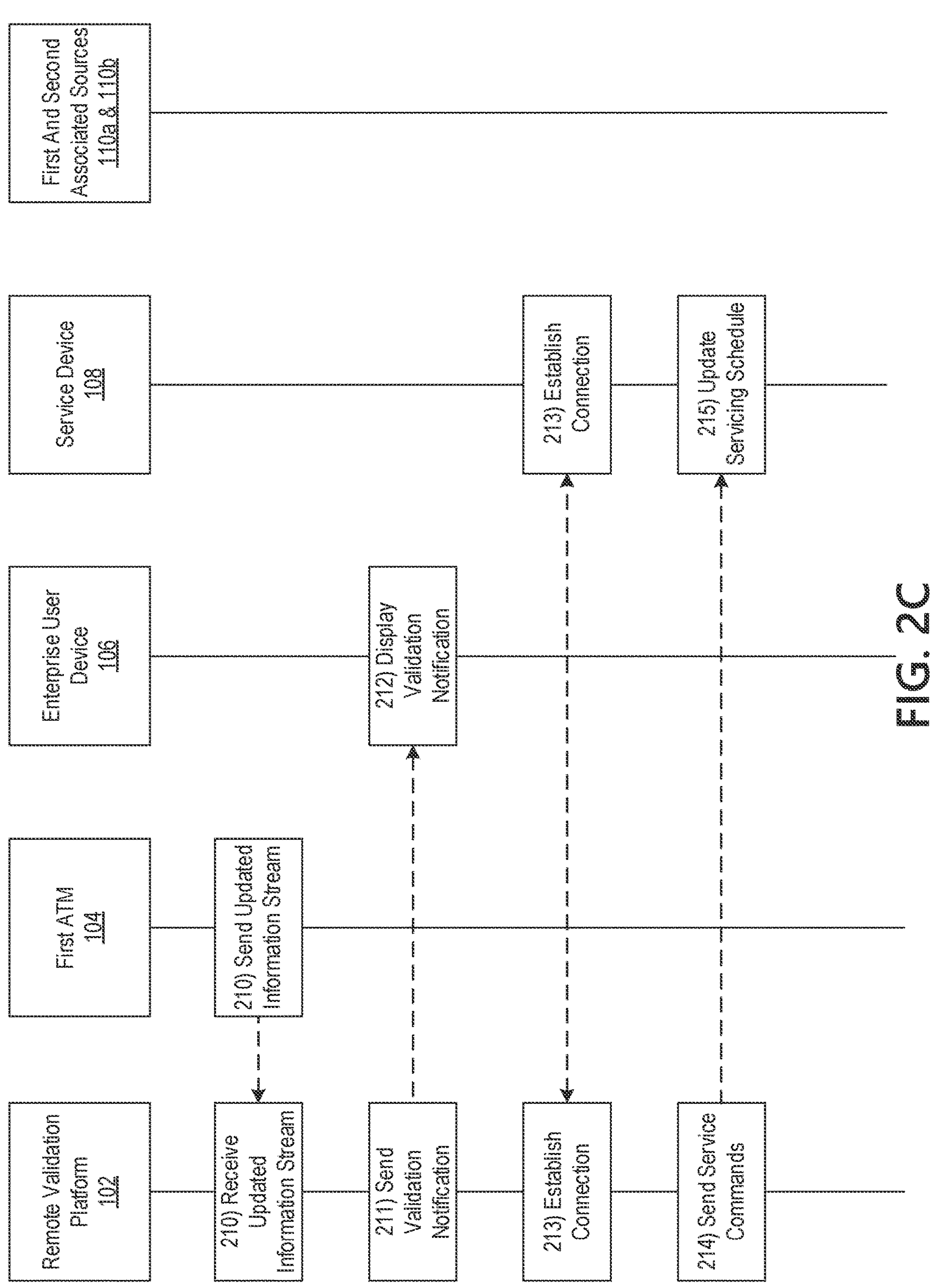
Figure 2D:
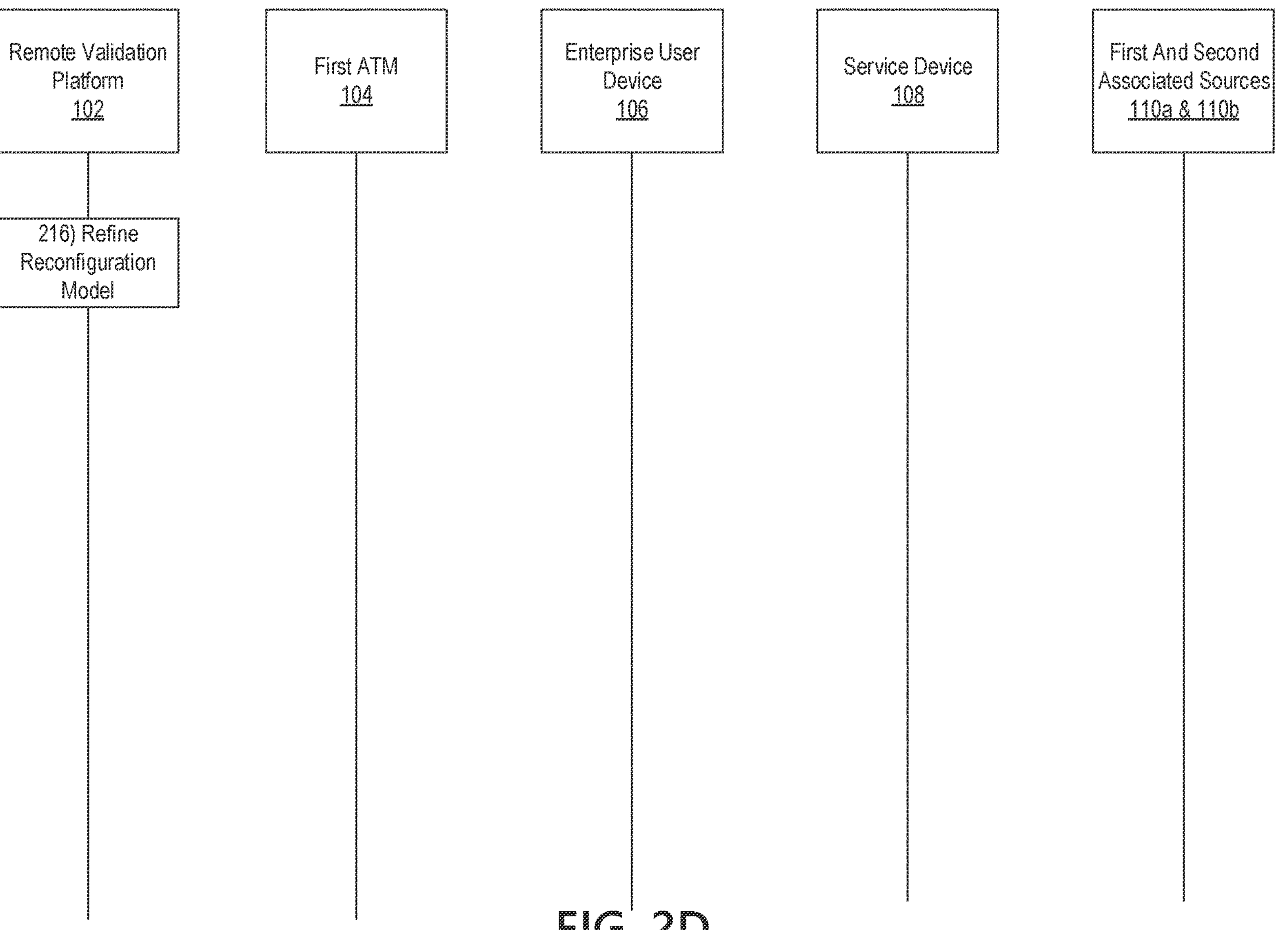

Referring to FIG. 2C, at step 210, the remote validation platform 102 may receive an updated information stream sent by the first ATM 104. In some instances, the remote validation platform 102 may receive the updated information stream based on or in response to a request from the remote validation platform 102 to the first ATM 104. In some examples, the first ATM 104 may be configured to automatically send an updated information stream to the remote validation platform 102 after receiving a set of configuration instructions (e.g., the first set of configuration instructions). The remote validation platform 102 may receive the updated information stream via the communication interface 113 and while the second wireless data connection is established.

The updated information stream may be and/or include one or more of: updated bill counts, each corresponding to a particular cassette of the plurality of cassettes within first ATM 104, updated bill thresholds, each corresponding to a particular cassette of the plurality of cassettes within first ATM 104, updated cassette modes, each corresponding to a particular cassette of the plurality of cassettes within first ATM 104, and/or other information of the updated configuration of the first ATM 104. For example, the updated information stream may be and/or include information indicating the results of the reconfiguration caused by remote validation platform 102 at step 209. In receiving the updated information stream, the remote validation platform 102 may identify, based on the updated information stream, whether or not the first ATM 104 is validated (e.g., whether or not the first ATM 104 has been reconfigured based on the first set of configuration instructions and the updated bill thresholds and/or updated cassette modes reflect the first set of configuration instructions).

In some instances, the remote validation platform 102 may have been configured to automatically validate the first ATM 104 and to automatically cause reconfiguration of the first ATM 104. In these instances, based on or in response to identifying that the first ATM 104 is validated, the remote validation platform 102 may proceed to refine the reconfiguration model (e.g., as described below at step 216). Additionally or alternatively, in some instances the remote validation platform 102 may be configured to, based on or in response to receiving the updated information stream, send a validation notification to enterprise user device 106 (e.g., as described below at steps 211-212). Additionally or alternatively, in some examples, the remote validation platform 102 may be configured to, based on or in response to receiving the updated information stream, update a servicing schedule corresponding to the first ATM 104 (e.g., as described below at steps 213-215).

At step 211, based on or in response to receiving the updated information stream, the remote validation platform 102 may send a validation notification indicating the results of the reconfiguration of first ATM 104 to enterprise user device 106. For example, the remote validation platform 102 may send the validation notification via the communication interface 113 and while the second wireless data connection is established. The validation notification may be and/or include the first set of configuration instructions and information indicating the results of the reconfiguration of the first ATM 104 (e.g., the updated cassette modes and thresholds of the cassettes within first ATM 104). In some instances, in sending the validation notification, the remote validation platform 102 may send one or more display commands directing the enterprise user device 106 to display a user interface (e.g., a validation notification interface) and request user input corresponding to the reconfiguration of the first ATM 104 (e.g., an updated set of configuration instructions, or confirmation of the first set of configuration instructions).

At step 212, based on or in response to receiving the validation notification from the remote validation platform 102, the enterprise user device 106 may display the validation notification. For example, based on or in response to the one or more commands directing the enterprise user device 106 to display the user interface, the enterprise user device 106 may display a validation notification interface. In some instances, the validation notification interface may be configured to receive user input through the enterprise user device 106.

Figure 3A:
FIGS. 3A-3B depict illustrative graphical user interfaces depicting remote validation of ATMs in accordance with one or more example arrangements.

For example, in displaying a validation notification interface, the enterprise user device 106 may display a graphical user interface similar to validation notification interface 300, which is illustrated in FIG. 3A. Referring to FIG. 3A, in some instances, the validation notification interface 300 may include information corresponding to the reconfiguration of first ATM 104. For example, the validation notification interface 300 may include information such as a notification indicating an ATM (e.g., first ATM 104) that remote validation interface 102 has reconfigured, the first set of configuration instructions, some or all of the updated information stream (e.g., the current cassette configurations for the ATM, and/or the current bill thresholds for the ATM), and/or other information. The validation notification interface 300 may also display interface elements or selectable options requesting user input. For example, the validation notification interface 300 may display one or more of: a button or buttons, toggle or toggles, check box or boxes, and/or other interface elements. For example, as illustrated in FIG. 3A, the interface elements may be buttons the user can select to decide whether or not to confirm a configuration (e.g., the current configuration of first ATM 104 based on the reconfiguration caused by remote validation platform 102).

In some instances, based on user input directing the enterprise user device 106 to confirm the configuration, the enterprise user device 106 may send one or more commands directing the remote validation platform 102 to update a service schedule (e.g., as described below at steps 213-215). In some examples, based on the one or more commands directing the remote validation platform 102 to update the service schedule, the remote validation platform 102 may progress to step 213 in FIG. 2C. In some instances, based on user input directing the enterprise user device 106 not to confirm the configuration, the enterprise user device 106 may send one or more commands directing the remote validation platform 102 to cause further reconfiguration of the first ATM 104. In some examples, the enterprise user device 106 may additionally send an updated set of configuration instructions for the remote validation platform 102 to use in reconfiguring the first ATM 104. For example, the enterprise user device 106 may send an updated set of configuration instructions generated by the enterprise user (e.g., an employee of the enterprise associated with the first ATM 104). Based on or in response to receiving the updated set of configuration instructions and the one or more commands directing the remote validation platform 102 to cause reconfiguration of the first ATM 104, the remote validation platform 102 may cause further reconfiguration of the first ATM 104 based on the updated set of configuration instructions (e.g., as described above at step 209).

Referring back to FIG. 2C, at step 213, the remote validation platform 102 may establish a connection with service device 108. In some instances, the remote validation platform 102 may automatically establish the connection with service device 108 after receiving the updated information stream (e.g., as described above at step 210). Additionally or alternatively, in some examples, the remote validation platform 102 may establish the connection with service device based on or in response to receiving the one or more commands directing the remote validation platform 102 to update the service schedule (e.g., as described above at step 212). In establishing the connection with service device 108, the remote validation platform 102 may establish a third wireless connection with service device 108. For example, the remote validation platform 102 may establish a third wireless data connection with service device 108 to link the service device 108 with the remote validation platform 102 (e.g., in preparation for receiving service commands, and/or other functions). In some instances, the remote validation platform 102 may identify whether or not a connection is already established with the service device 108. If a connection is already established with the service device 108, the remote validation platform 102 might not re-establish the connection. If a connection is not yet established with the service device 108, the remote validation platform 102 may establish the third wireless data connection as described above.

At step 214, the remote validation platform 102 may send one or more service commands to the service device 108. For example, the remote validation platform 102 may send the one or more service commands via the communication interface 113 and while the third wireless data connection is established. In some examples, the one or more service commands may be and/or include one or more commands directing the service device 108 to update a service schedule corresponding to first ATM 104 based on the first set of configuration instructions. The one or more commands directing the service device 108 to update the service schedule may cause the service device 108 to update the service schedule (e.g., as described below at step 215). Additionally or alternatively, in some instances, the one or more service commands may be and/or include one or more display commands directing the service device 108 to display a user interface (e.g., a servicing schedule interface) and request user input corresponding to the service schedule (e.g., confirmation of the updated service schedule). Additionally or alternatively, in some instances, the one or more service commands may be and/or include one or more commands causing an autonomous vehicle to modify a service route corresponding to a plurality of ATMs.

At step 215, based on or in response to receiving the one or more service commands from the remote validation platform 102, the service device 108 may update the service schedule. For example, the service device 108 may automatically modify a service schedule indicating the route an ATM servicer (e.g., an employee of an ATM repair organization associated with service device 108, and/or other ATM service providers) should take in repairing and/or reconfiguring a plurality of ATMs. For instance, based on the first set of configuration instructions for first ATM 104, the remote validation platform 102 may have sent one or more service commands directing the service device 108 to remove first ATM 104 from the service schedule. Additionally or alternatively, in some examples, based on receiving the one or more commands directing the service device 108 to display a user interface, the service device 108 may display a servicing schedule interface. In some instances, the servicing schedule interface may be configured to receive user input through the service device 108. In some examples, the service device 108 may delay updating the service schedule until user input is received through the service device 108.

Figure 3B:
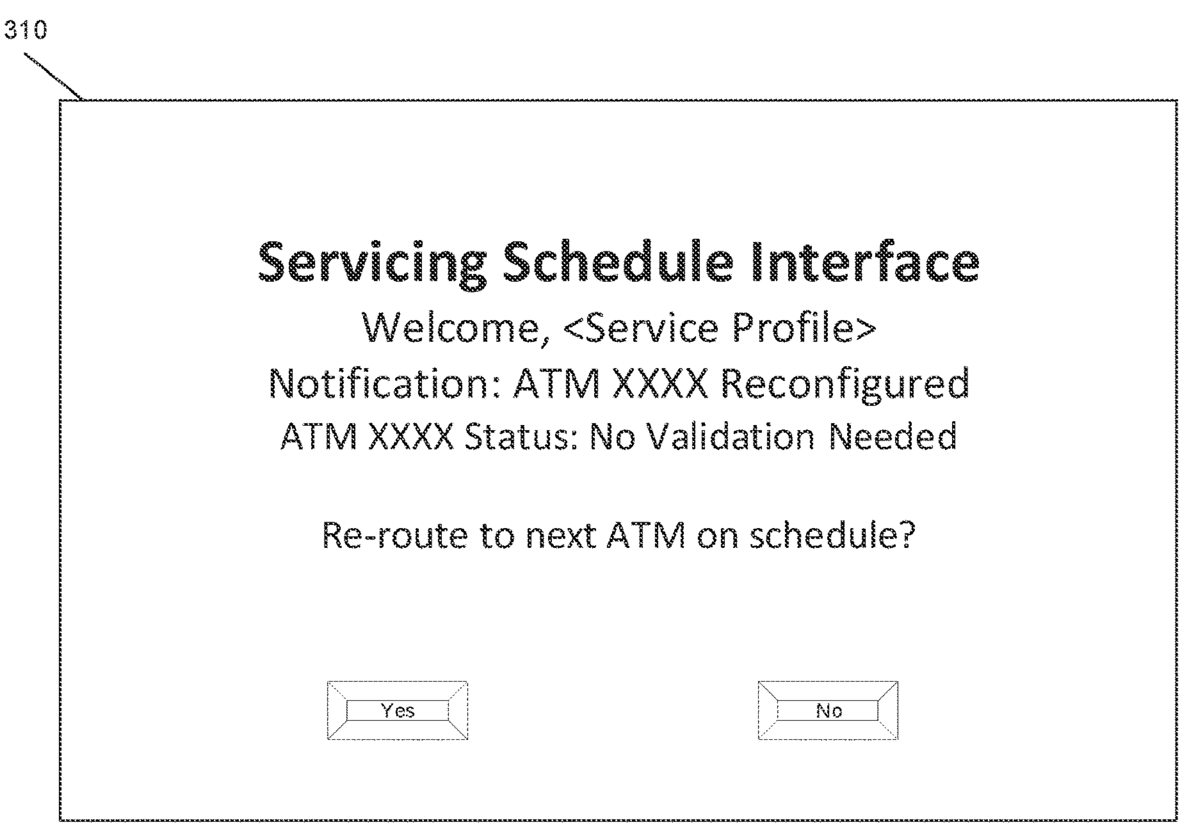

For example, in displaying a servicing schedule interface, the enterprise user device 106 may display a graphical user interface similar to servicing schedule interface 310, which is illustrated in FIG. 3B. Referring to FIG. 3B, in some instances, the servicing schedule interface 310 may include information corresponding to first ATM 104 and information of the updated service schedule. For example, the servicing schedule interface 310 may include information such an indication that remote validation interface 102 has reconfigured first ATM 104, information indicating the updated service schedule, and/or other information. The servicing schedule interface 310 may also display interface elements or selectable options requesting user input. For example, the servicing schedule interface 310 may display one or more of: a button or buttons, toggle or toggles, check box or boxes, and/or other interface elements. For example, as illustrated in FIG. 3B, the interface elements may be buttons the user can select to decide whether or not to confirm a change to the service schedule (e.g., changing the route for the ATM servicer to skip the first ATM 104). In some instances, based on or in response to user input confirming the change to the service schedule, the service device 108 may update the service schedule (e.g., by removing the first ATM 104 from the ATM servicer's digital routing application and/or digital calendar). In some examples, based on or in response to user input rejecting the change to the service schedule, the service device 108 may route the service provider to the first ATM 104.

Additionally or alternatively, in some instances, based on or in response to receiving one or more service commands directing an autonomous vehicle to modify a service route corresponding to a plurality of ATMs, the service device 108 may modify the service route of an autonomous vehicle. For example, the service device 108 may be and/or include an autonomous vehicle processing unit that may, e.g., modify a preprogrammed service route corresponding to a plurality of ATMs to remove first ATM 104 from the service route, thereby modifying the route the autonomous vehicle will drive.

Referring to FIG. 3D, at step 216, the remote validation platform 102 may refine, validate, and/or otherwise update the reconfiguration model based on the first set of configuration instructions. In some instances, refining the reconfiguration model may include inputting the first set of configuration instructions into the reconfiguration model. By inputting the first set of configuration instructions into the reconfiguration model, the remote validation platform 102 may create an iterative feedback loop that may continuously and dynamically refine the reconfiguration model to improve its accuracy. For example, the remote validation platform 102 may identify that a particular subset of the one or more additional information streams (e.g., an event notification for a particular type of event, a particular type of community notification, a particular weather forecast, and/or other subsets of information), when received by the remote validation platform 102 along with a particular subset of the first information stream (e.g., a number of a particular type of cassette modes, one or more particular cassette thresholds, and/or other subsets of information) contributed to a particular configuration instruction (e.g., an instruction to set one or more cassettes to a new threshold, an instruction to modify the cassette modes of one or more cassettes, and/or other instructions). For instance, the remote validation platform 102 may identify, based on inputting the first set of configuration instructions into the reconfiguration model, that when a music concert was scheduled within ten blocks of first ATM 104 and first ATM 104 included four cassettes, none of which were configured to operate in recycle mode, a configuration instruction was generated to change the cassette mode of one cassette to operate in recycle mode. In these examples, the remote validation platform 102 may refine the reconfiguration model to automatically generate the same configuration instruction when the same subsets of information are received in the one or more additional information streams and the first information stream in future iterations of the feedback loop. In doing so, the remote validation platform 102 may improve the accuracy and efficiency of the configuration instruction generation process by the reconfiguration model, which may, e.g., result in more efficient training of models trained and/or executed by the remote validation platform 102 (and may in some instances conserve computing and/or processing power/resources in doing so).

Figure 4:
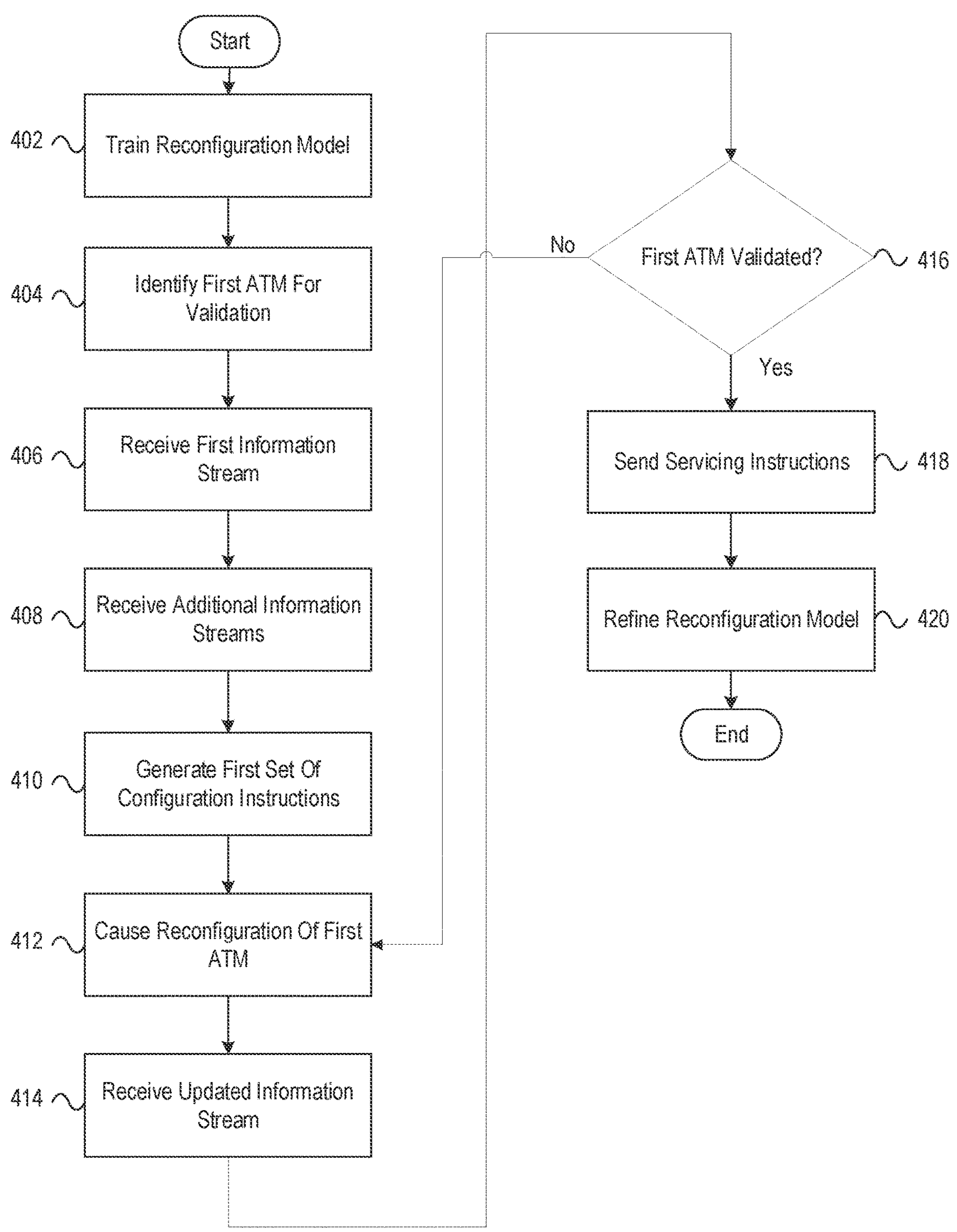
FIG. 4 depicts an illustrative method for remote validation of ATMs in accordance with one or more example arrangements.

FIG. 4 depicts an illustrative method for remote validation of ATMs in accordance with one or more example arrangements. Referring to FIG. 4, at step 402, a computing platform having at least one processor, a communication interface, and memory may train a machine learning model. For example, the computing platform may train a reconfiguration model. At step 404, the computing platform may identify a first ATM for validation. A step 406, based on identifying the first ATM, the computing platform may receive a first information stream from the first ATM. At step 408, the computing platform may receive one or more additional information streams from sources associated with the first ATM. At step 410, the computing platform may generate a first set of configuration instructions based on the first information stream and the one or more additional information streams. At step 412, the computing platform may cause reconfiguration of the first ATM. At step 414, the computing platform may receive an updated information stream from the first ATM.

At step 416, the computing platform may identify whether or not the first ATM is validated. Based on identifying that the first ATM is not validated, the computing platform may return to step 412 and cause further reconfiguration of the first ATM. Based on identifying that the first ATM is validated, the computing platform may progress to step 418. At step 418, the computing platform may send servicing instructions to a service device. At step 420, the computing platform may refine and/or update a machine learning model. For example, the computing platform may refine and/or update the reconfiguration model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, based on historical configuration information, a reconfiguration model, wherein training the reconfiguration model configures the reconfiguration model to output, for an automated teller machine (ATM), sets of configuration instructions for modifying settings of cassettes of ATMs;

send, based on identifying that a predetermined period of time has elapsed, an automatic request for a first information stream from a first ATM comprising a plurality of cassettes, wherein each of the plurality of cassettes comprises a corresponding cassette mode;

receive, from the first ATM, the first information stream;

receive, from one or more sources associated with the first ATM, one or more additional information streams;

generate, based on inputting the first information stream and the one or more additional information streams into the reconfiguration model, a first set of configuration instructions for modifying settings of one or more cassettes of the first ATM;

cause, based on the first set of configuration instructions, reconfiguration of the first ATM, wherein the reconfiguration of the first ATM comprises one or more of:

setting, for one or more of the plurality of cassettes, one or more cassette thresholds, wherein each of the one or more cassette thresholds corresponds to a particular type of bill, or modifying, for one or more of the plurality of cassettes, the corresponding cassette mode; and refine the reconfiguration model by inputting the first set of configuration instructions into the reconfiguration model.

2. The computing platform of claim 1, wherein the one or more sources associated with the first ATM comprise one or more additional ATMs located within a predetermined proximity to the first ATM.

3. The computing platform of claim 1, wherein the one or more sources associated with the first ATM comprise one or more of:

weather reporting services, ATM servicing providers, financial institutions, event notification services, or community notification services.

4. The computing platform of claim 1, wherein the modifying of the corresponding cassette mode comprises, for one or more of the plurality of cassettes, changing the corresponding cassette mode to one of the following:

a recycle mode, a deposit mode, a withdrawal mode, or a reject mode.

5. The computing platform of claim 1, wherein the first information stream comprises one or more of:

one or more current bill counts, wherein each of the one or more current bill counts corresponds to a particular cassette of the plurality of cassettes, one or more current bill thresholds, wherein each of the one or more current bill thresholds corresponds to a particular cassette of the plurality of cassettes, or one or more current cassette modes, wherein each of the one or more current cassette modes corresponds to a particular cassette of the plurality of cassettes.

6. The computing platform of claim 1, wherein the one or more additional information streams comprises one or more:

one or more current bill thresholds corresponding to one or more additional ATMs, one or more current cassette modes corresponding to one or more additional ATMs, current weather information, servicing information corresponding to the first ATM, current event information for a geographical region corresponding to the first ATM, configuration preferences corresponding to a financial institution associated with the first ATM, or community information for a geographical region corresponding to the first ATM.

7. The computing platform of claim 1, wherein the memory stores additional computer-readable instructions that, when executed by the at least one processor, cause the computing platform to:

receive, from an enterprise user device corresponding to an enterprise associated with the first ATM, a request to validate the first ATM; and request, based on the request to validate the first ATM, the first information stream from the first ATM.

8. The computing platform of claim 1, wherein the memory stores additional computer-readable instructions that, when executed by the at least one processor, cause the computing platform to:

identify, based on an updated information stream received from the first ATM, a reconfiguration result, wherein the reconfiguration result indicates whether or not the first ATM is validated.

9. The computing platform of claim 8, wherein the causing the reconfiguration of the first ATM is based on identifying that the reconfiguration result indicates that the first ATM is validated.

10. The computing platform of claim 1, wherein the memory stores additional computer-readable instructions that, when executed by the at least one processor, cause the computing platform to:

cause, based on the first set of configuration instructions, a service device associated with the first ATM and different from the computing platform to update a service schedule corresponding to the first ATM; and send, to the service device, one or more display commands, wherein the one or more display commands cause the service device to display a user interface comprising information of the first ATM and the updated service schedule.

11. The computing platform of claim 1, wherein the memory stores additional computer-readable instructions that, when executed by the at least one processor, cause the computing platform to cause, based on the first set of configuration instructions, an autonomous vehicle associated with a service provider corresponding to the first ATM to modify a service route corresponding to a plurality of ATMs.

12. The computing platform of claim 1, wherein the causing the reconfiguration of the first ATM comprises automatically reconfiguring the first ATM.

13. The computing platform of claim 1, wherein the causing the reconfiguration of the first ATM comprises:

sending, to an enterprise user device associated with the first ATM, one or more commands to display a user interface, wherein the user interface comprises the first set of configuration instructions and an updated information stream;

receiving, from the enterprise user device, an updated set of configuration instructions; and reconfiguring, based on the updated set of configuration instructions, the first ATM.

14. The computing platform of claim 1, wherein the causing the reconfiguration of the first ATM comprises sending one or more commands from the computing platform to the first ATM to change a cassette mode of the one or more cassettes.

15. A method comprising:

at a computing platform comprising at least one processor, a communication interface, and memory:

training, based on historical configuration information, a reconfiguration model, wherein training the reconfiguration model configures the reconfiguration model to output, for an automated teller machine (ATM), sets of configuration instructions for modifying settings of cassettes of ATMs;

sending, based on identifying that a predetermined period of time has elapsed, an automatic request for a first information stream from a first ATM comprising a plurality of cassettes, wherein each of the plurality of cassettes comprises a corresponding cassette mode;

receiving, from the first ATM, the first information stream;

receiving, from one or more sources associated with the first ATM, one or more additional information streams;

generating, based on inputting the first information stream and the one or more additional information streams into the reconfiguration model, a first set of configuration instructions for modifying settings of one or more cassettes of the first ATM;

causing, based on the first set of configuration instructions, reconfiguration of the first ATM, wherein the reconfiguration of the first ATM comprises one or more of:

setting, for one or more of the plurality of cassettes, one or more cassette thresholds, wherein each of the one or more cassette thresholds corresponds to a particular type of bill, or modifying, for one or more of the plurality of cassettes, of the corresponding cassette mode; and refining the reconfiguration model by inputting the first set of configuration instructions into the reconfiguration model.

16. The method of claim 15, wherein the one or more sources associated with the first ATM comprise one or more additional ATMs located within a predetermined proximity to the first ATM.

17. The method of claim 15, wherein the one or more sources associated with the first ATM comprise one or more of:

weather reporting services, ATM servicing providers, financial institutions, event notification services, or community notification services.

18. The method of claim 15, wherein the first information stream comprises one or more of:

one or more current bill counts, wherein each of the one or more current bill counts corresponds to a particular cassette of the plurality of cassettes, one or more current bill thresholds, wherein each of the one or more current bill thresholds corresponds to a particular cassette of the plurality of cassettes, or one or more current cassette modes, wherein each of the one or more current cassette modes corresponds to a particular cassette of the plurality of cassettes.

19. The method of claim 15, wherein the one or more additional information streams comprises one or more:

one or more current bill thresholds corresponding to one or more additional ATMs, one or more current cassette modes corresponding to one or more additional ATMs, current weather information, servicing information corresponding to the first ATM, current event information for a geographical region corresponding to the first ATM, configuration preferences corresponding to a financial institution associated with the first ATM, or community information for a geographical region corresponding to the first ATM.

20. One or more non-transitory computer-readable media storing instructions that, when executed by a computing platform comprising at least one processor, a communication interface, and memory, cause the computing platform to:

train, based on historical configuration information, a reconfiguration model, wherein training the reconfiguration model configures the reconfiguration model to output, for an automated teller machine (ATM), sets of configuration instructions for modifying settings of cassettes of ATMs;

send, based on identifying that a predetermined period of time has elapsed, an automatic request for a first information stream from a first ATM comprising a plurality of cassettes, wherein each of the plurality of cassettes comprises a corresponding cassette mode;

receive, from the first ATM, the first information stream;

receive, from one or more sources associated with the first ATM, one or more additional information streams;

generate, based on inputting the first information stream and the one or more additional information streams into the reconfiguration model, a first set of configuration instructions for modifying settings of one or more cassettes of the first ATM;

cause, based on the first set of configuration instructions, reconfiguration of the first ATM, wherein the reconfiguration of the first ATM comprises one or more of:

setting, for one or more of the plurality of cassettes, one or more cassette thresholds, wherein each of the one or more cassette thresholds corresponds to a particular type of bill, or modifying, for one or more of the plurality of cassettes, of the corresponding cassette mode; and refine the reconfiguration model by inputting the first set of configuration instructions into the reconfiguration model.

* * * * *